US010520957B2

(12) United States Patent
Welch, II et al.

(10) Patent No.: US 10,520,957 B2
(45) Date of Patent: Dec. 31, 2019

(54) PRESSURE REGULATING DEVICE HAVING A VARIABLE TRAVEL STOP

(71) Applicant: EMERSON PROCESS MANAGEMENT REGULATOR TECHNOLOGIES, INC., McKinney, TX (US)

(72) Inventors: Jeff Welch, II, McKinney, TX (US); Jake Buford, The Colony, TX (US); Matthew D. Reynolds, Dallas, TX (US); Christopher J. Hunt, Redondo Beach, CA (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 90 days.

(21) Appl. No.: 15/299,159

(22) Filed: Oct. 20, 2016

(65) Prior Publication Data
US 2017/0108881 A1    Apr. 20, 2017

Related U.S. Application Data

(60) Provisional application No. 62/244,104, filed on Oct. 20, 2015.

(51) Int. Cl.
*G05D 16/06* (2006.01)
*F16K 1/52* (2006.01)

(52) U.S. Cl.
CPC ......... *G05D 16/0683* (2013.01); *F16K 1/523* (2013.01); *G05D 16/0666* (2013.01); *Y10T 137/7805* (2015.04)

(58) Field of Classification Search
CPC ............... F16K 1/523; G05D 16/0683; G05D 16/0666; G05D 16/0663
See application file for complete search history.

(56) References Cited

U.S. PATENT DOCUMENTS

| 2,853,268 A | * | 9/1958 | Hughes | G05D 16/0655 |
| | | | | 137/505.18 |
| 3,556,137 A | * | 1/1971 | Billeter | E03D 3/02 |
| | | | | 137/543.15 |

(Continued)

FOREIGN PATENT DOCUMENTS

| GB | 251392 A | * | 5/1926 | ......... F16K 31/1262 |
| GB | 1345792 A | | 2/1974 | |

OTHER PUBLICATIONS

FPRS machine translation abstract of GB 251392.*

(Continued)

*Primary Examiner* — Jessica Cahill
*Assistant Examiner* — Patrick C Williams
(74) *Attorney, Agent, or Firm* — Marshall, Gerstein & Borun LLP (57) ABSTRACT

A pressure regulating device including a valve body, an actuator assembly coupled to the valve body and including a diaphragm, a valve seat disposed in the valve body, a control assembly operatively connected to the diaphragm to move responsive to movement of the diaphragm, and a travel stop. The control assembly includes a control element that is movable, relative to the valve seat, between an open position, wherein the control element is spaced from the valve seat, and a closed position, wherein the control element sealingly engages the valve seat. The travel stop is configured to engage the control element to stop movement of the control element upon reaching the open position. The travel stop is adjustable to change the open position of the control element, such that a wide open flow capacity of the pressure regulating device can be adjusted.

20 Claims, 4 Drawing Sheets

(56) References Cited

U.S. PATENT DOCUMENTS

| | | | |
|---|---|---|---|
| 3,602,478 A * | 8/1971 | Cairns | F16K 31/1655 |
| | | | 251/285 |
| 2003/0089867 A1 * | 5/2003 | Hall | F15B 15/10 |
| | | | 251/60 |
| 2006/0207666 A1 | 9/2006 | Micheel et al. | |
| 2008/0197310 A1 * | 8/2008 | Gethmann | F16K 1/523 |
| | | | 251/205 |
| 2011/0174395 A1 | 7/2011 | Clifford et al. | |
| 2013/0000756 A1 | 1/2013 | Griffin, Jr. et al. | |
| 2015/0260306 A1 | 9/2015 | Arnold et al. | |

OTHER PUBLICATIONS

International Search Report and Written Opinion for PCT/US2016/057799, dated Jan. 31, 2017.
Types 1098-EGR and 1098H-EGR Pressure Reducing Regulators, Bulletin 71.2:1098-EGR, Emerson Process Management, Feb. 2015.
Type MR105 Direct-Operated Pressure Reducing Regulators, Bulletin 71.1:MR105, Emerson Process Management, Jan. 2015.

* cited by examiner

PRESSURE REGULATING DEVICE HAVING A VARIABLE TRAVEL STOP

FIELD OF THE INVENTION

The present invention relates generally to pressure regulating devices such as pressure regulators and, more specifically, to a pressure regulating device having a travel stop that can be varied to adjust a wide open flow capacity of the pressure regulating device.

BACKGROUND

As is known, the pressure at which a typical fluid distribution system supplies fluid may vary according to the demands placed on the system, the climate, the source of the supply, and/or other factors. However, most end-user facilities equipped with fluid appliances such as, for example, furnaces, and ovens, require the fluid to be delivered in accordance with predetermined pressure parameters. Therefore, pressure regulators are commonly employed to control the pressure in the system downstream of the regulator while matching a downstream flow demand.

Pressure regulators are typically used to regulate the pressure of a fluid to a substantially constant value. Specifically, a pressure regulator has an inlet that typically receives a supply fluid at a relatively high pressure and provides a relatively lower and substantially constant pressure at an outlet. To regulate the downstream pressure, pressure regulators commonly include a sensing element or diaphragm to sense an outlet pressure in fluid communication with a downstream pressure.

When purchasing a pressure regulator, a customer needs to size the pressure regulator to meet a desired capacity at process conditions representing the full range of required pressures and flow rates which the fluid distribution system could experience. When, however, a perfectly-sized pressure regulator does not exist (i.e., the available sizes do not exactly match up with the size needed to provide the desired capacity), as is almost always the case, the customer must choose the pressure regulator corresponding to the next size up. In other words, the customer must select a larger pressure regulator than necessary. As an example, a pressure regulator having a 2" body may be too small to meet the desired capacity, and a pressure regulator having a 3" body may be larger than necessary, but the customer must still purchase the pressure regulator having the 3" body.

While the larger pressure regulator may meet the desired capacity at worst-case conditions, larger pressure regulators create the potential for greater leakage in a failure situation. This also means more expensive relief capabilities. Because pressure in the system in excess of a predetermined range or threshold can damage the components of a pressure regulator, most systems that employ pressure regulators also include a pressure relief valve located downstream of the regulator to prevent the pressure in the pressure regulator from exceeding this predetermined range or threshold. However, because pressure relief valves are sized based on the wide open flow capacity at the worst-case condition for the upstream pressure regulator, and because pressure relief valves are expensive, employing larger pressure regulators than truly necessary leads the use of larger pressure relief valves than necessary, which leads to unnecessary, and in some cases quite significant, costs for the customer.

In an attempt to limit the potential for leakage and lessen the cost of accompanying relief capabilities, customers have in the past utilized restriction collars or reduced the size of the valve port between the inlet and the outlet, thereby limiting the maximum flow through the regulator (i.e., reducing the flow capacity of the regulator) as much as possible while still meeting the desired capacity. However, these solutions, while effective, require a greater than insignificant amount of design work, testing, and iteration, which is both costly and time-consuming.

SUMMARY

In accordance with a first exemplary aspect of the present invention, a pressure regulating device is provided. The pressure regulating device includes a valve body having an inlet, an outlet, and a fluid passageway defined therebetween. The pressure regulating device includes an actuator assembly coupled to the valve body and a valve seat disposed in the valve body along the fluid passageway. The actuator assembly includes an upper casing, a lower casing secured to the upper casing, and a diaphragm disposed between the upper casing and the lower casing. The pressure regulating device includes a control assembly operatively connected to the diaphragm to move responsive to movement of the diaphragm. The control assembly includes a valve stem and a control element operatively connected to the valve stem. The control element is movable, relative to the valve seat, between an open position, wherein the control element is spaced from the valve seat, and a closed position, wherein the control element sealingly engages the valve seat. The travel stop is configured to engage the control element to stop movement of the control element upon reaching the open position. The travel stop is adjustable to change the open position of the control element, such that a wide open flow capacity of the pressure regulating device can be adjusted.

In accordance with a second exemplary aspect of the present invention, a control assembly is provided for controlling fluid flow in a pressure regulating device having a valve body and a valve seat disposed in the valve body. The control assembly includes a valve stem, a control element operatively connected to the valve stem, and a travel stop. The control element is adapted to be movable, relative to the valve seat, between an open position, wherein the control element is spaced from the valve seat, and a closed position, wherein the control element sealingly engages the valve seat. The travel stop is configured to engage the control element to stop movement of the control element upon reaching the open position, and is adjustable to change the open position of the control element.

In accordance with a third exemplary aspect of the present invention, a method of adjusting a wide open flow capacity of a pressure regulating device is provided. The pressure regulating device has a valve body, an actuator assembly coupled to the valve body and comprising an upper casing, a lower casing secured to the upper casing, and a diaphragm disposed between the upper casing and the lower casing, a valve seat disposed in the valve body along a fluid passageway, and control assembly operatively connected to the diaphragm to move responsive to movement of the diaphragm. The control assembly includes a valve stem and a control element operatively connected to the valve stem. The control element is movable, relative to the valve seat, between an open position, wherein the control element is spaced from the valve seat, and a closed position, wherein the control element sealingly engages the valve seat. The method includes adjusting a travel stop configured to engage the control element to stop movement of the control element upon reaching the open position, thereby changing the open position of the control element.

In further accordance with any one or more of the foregoing first, second, and third exemplary aspects, a pressure regulating device, a control assembly, and/or a method of adjusting a wide open flow capacity of a pressure regulating device may include any one or more of the following further preferred forms.

In one preferred form, a portion of the travel stop is movable relative to the control element.

In another preferred form, a bonnet assembly is coupled to the valve body, the bonnet assembly defining a seating surface for the travel stop.

In another preferred form, the travel stop includes a first portion and a second portion movable relative to the first portion and the control element to adjust the travel stop, wherein one of the first portion and the second portion engages the seating surface of the bonnet assembly when the control element has reached the open position.

In another preferred form, the second portion is movable relative to the first portion to adjust a length of the travel stop, thereby changing the open position of the control element.

In another preferred form, when the control element is in the open position, the control element is spaced a first distance from the valve seat when the first portion engages the seating surface of the bonnet assembly, and the control element is spaced a second distance from the valve seat when the second portion engages the seating surface of the bonnet assembly, the first distance being greater than the second distance.

In another preferred form, the second portion is threaded to the first portion.

In another preferred form, a cap is coupled to the valve body, and wherein the travel stop comprises a bolt threadingly disposed in a bore formed in the cap.

In another preferred form, the cap defines a surface arranged in the valve body, and the bolt is movable, relative to the surface, to change the open position of the control element.

In another preferred form, the bolt has a stop surface configured to engage the control element when the control element has reached the open position.

In another preferred form, the travel stop includes a first portion and a second portion movable relative to the first portion and the control element to adjust the travel stop.

In another preferred form, the travel stop comprises a bolt.

In another preferred form, the control element is movable along a longitudinal axis, and wherein the travel stop is rotatable about the longitudinal axis.

In another preferred form, adjusting the travel stop includes increasing or decreasing a length of the travel stop by rotating a second portion of the travel stop relative to a first portion of the travel stop.

In another preferred form, adjusting the travel stop comprises moving a bolt threadingly disposed in a bore of the pressure regulating device toward or away from the valve seat.

DETAILED DESCRIPTION OF THE PREFERRED EMBODIMENTS

FIGS. 1, 1A, 2, and 2A illustrate a pressure regulating device in the form of a pressure regulator 100 constructed in accordance with the teachings of the present invention. The pressure regulator 100 generally includes a valve body 104, an actuator assembly 108 coupled to the valve body 104, and a bonnet assembly 112 coupled to the valve body 104. The actuator assembly 108 is coupled (e.g., secured) to the valve body 104 with threaded studs 116 and locknuts 120, though the actuator assembly 108 can be coupled to the valve body 104 by any other well-known means. The bonnet assembly 112 is likewise coupled (e.g., secured) to the valve body 104 with threaded studs 124 and locknuts, though the bonnet assembly 112 can be coupled to the valve body 104 by any other well-known means.

The valve body 104 defines a fluid inlet 150, a fluid outlet 154, and a valve port 158 disposed between, and fluidly connecting, the inlet 150 and the outlet 154. A valve seat 162, e.g., a seat ring, is secured in the valve port 158 and provides or defines a seating surface 166. The regulator 100 further includes a control assembly 170 arranged within the valve body 104. The control assembly 170 includes, in relevant part, a control element 174, e.g., a valve plug or a valve disk, that is movable relative to the valve seat 162 (and more particularly the seating surface 166) to control a flow of fluid (e.g., gas, liquid) through the valve port 158 and between the inlet 150 and the outlet 154. The control assembly 170 also includes a cage 178 and a valve spring 182. The cage 178 is arranged in the valve body 104 and is sized to receive the control element 174. As is known in the art, the cage 178 can provide certain flow characteristics of the fluid (e.g., reduces noise and/or cavitation generated by the fluid flow through the regulator 100). To this end, the cage 178 can, for example, include one or more passages, apertures, or windows. The valve spring 182 is arranged in the valve body 104 and is seated between the control element 174 and a portion of the bonnet assembly 112. More particularly, the valve spring 182 is arranged or seated between the portion of the bonnet assembly 112 and an underside 185 of the control element 174 (the underside 185 being opposite the surface of the control element 174 that selectively engages the seating surface 166). The valve spring 182 thus biases the control element 174 toward, and into contact with, the valve seat 162. The regulator 100 also includes a seat 184 that is coupled to and disposed on the underside 185 of the control element 174.

Figures 1, 1A:
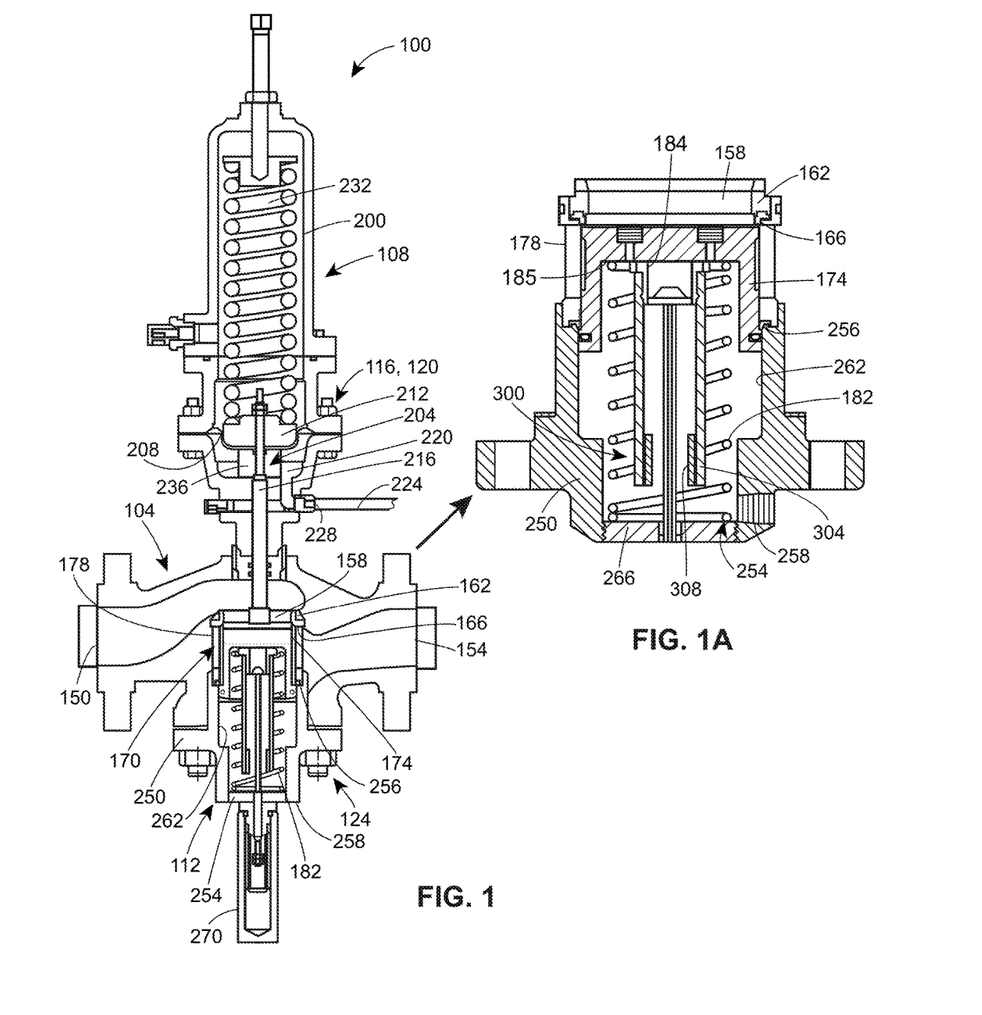
FIG. 1 is a cross-sectional view of a pressure regulating device constructed in accordance with the teachings of a first disclosed example of the present invention, showing the pressure regulating device in a closed position and employing one example of a travel stop that can be varied to adjust the flow capacity of the pressure regulating device.
FIG. 1A is a close-up, cross-sectional view of a portion of the pressure regulating device of FIG. 1.
Figures 2, 2A:
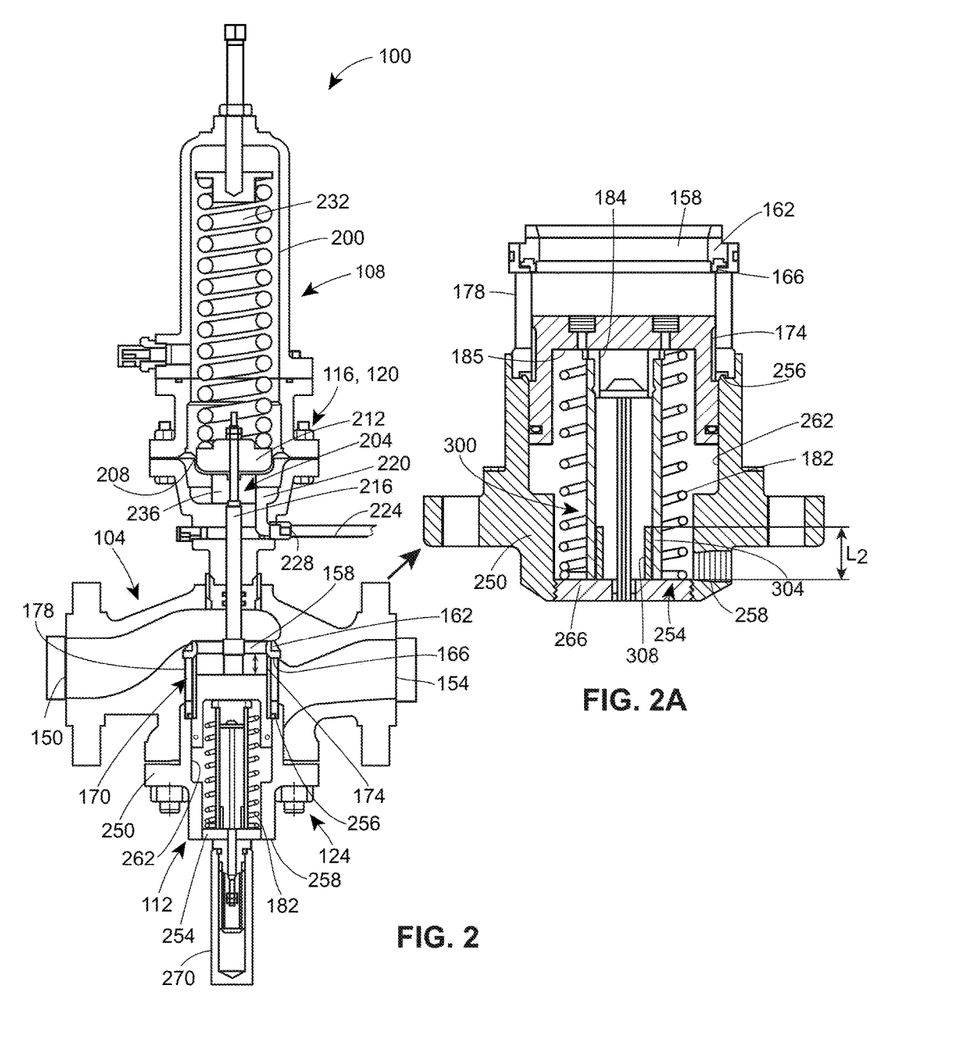
FIG. 2 is similar to FIG. 1, but shows the pressure regulating device in an open position.
FIG. 2A is similar to FIG. 1A, but shows the variable travel stop in a first, fully open configuration corresponding to a maximum flow capacity of the pressure regulating device.

The actuator assembly 108 is coupled to the valve body 104 to ensure that the pressure at the outlet 154 of the valve body 108, i.e., the outlet pressure, is in accordance with a desired outlet or control pressure. The actuator assembly 108 is a diaphragm-based actuator assembly and includes an actuator housing 200 containing a control assembly 204 for regulating the outlet pressure of the valve body 104 based on sensed outlet pressure. The control assembly 204 generally includes a diaphragm 208, a piston 212 operatively connected to the diaphragm 208, and a stem 216 operatively connected to the piston 212. The stem 216 is also connected to the movable control element 174 of the control assembly 170, such that movement of the actuator assembly 108 moves the control element 174 relative to the valve seat 162. The control assembly 204 also includes a diaphragm chamber 220, which is in fluid communication with the outlet 154 via a feedback tube 224. The feedback tube 224 has one end 228 in fluid communication with the diaphragm chamber 220 and another end (not shown) disposed opposite the end 228 and configured to sense the pressure at or in the outlet 154. The control assembly 204 further includes a control spring 232 in engagement with a top side of the control assembly 204 (and more particularly the piston 212) to offset the outlet pressure sensed by the diaphragm 208. Accordingly, the desired outlet pressure, which may also be referred to as the control pressure, is set by the selection of the control spring 232.

The bonnet assembly 112, which, as noted above, is coupled to the valve body 104, includes a body portion 250 and a seat 254 threaded to the body portion 250. The body portion 250 has a top end 256 that engages a bottom portion of the cage 178 and a bottom end 258 that threadably receives the seat 254. The body portion 250 defines an interior bore 262 that receives at least a portion of the control element 174 and at least a portion of the valve spring 182. More specifically, one end of the valve spring 182 is seated against a seating surface 266 defined by the seat 254. The stem 216 passes through the interior bore 262, passes through an opening formed in the seat 254, and is received in an outwardly extending portion 270 of the bonnet assembly 112 in a manner that facilitates upward and downward movement of the stem 216 (and thus the control element 174).

Generally speaking, the inlet 150 of the regulator 100 receives fluid from a fluid (e.g., gas) distribution system, for example, and the outlet 154 delivers fluid to an end-user facility such as a factory, a restaurant, an apartment building, etc. having one or more appliances. The actuator assembly 108, via the control assembly 204, controls the position of the control element 174, and, consequently, fluid flowing through the regulator device 100. When, for example, the control element 174 is in the closed position illustrated in FIGS. 1 and 1A, the control element 174 sealingly engages the seating surface 166 of the valve seat 162, such that fluid is prevented from flowing through the valve port 158. When, however, the control element 174 is moved, by the actuator assembly 108, to the fully open position illustrated in FIGS. 2 and 2A, the control element 174 is spaced a maximum distance from the seating surface 166 of the valve seat 162, such that a maximum amount of fluid flow is permitted through the regulator device 100 via the valve port 158. This maximum amount of fluid flow is what defines a maximum flow capacity of the regulator 100. It will be appreciated that the maximum flow capacity of the regulator 100 can vary in other examples.

When the regulator 100 is operational, the control assembly 204 regulates the outlet pressure of the body 104 of the regulator device 100 based on the outlet pressure sensed in or at the outlet 154. More specifically, the diaphragm 208 senses the outlet pressure of the valve 104 and provides a response to move the stem 216 to open and close the valve 104. Specifically, the control assembly 204 includes a diaphragm support plate 236 coupled to the piston 212, which together move the position of the diaphragm 208, the stem 216, and ultimately the control element 174. The end of the feedback tube 224 that is not shown senses the pressure in or at the outlet 154. If the sensed pressure is too low (e.g., because downstream demand has increased), the pressure in the diaphragm chamber 220 drops accordingly by virtue of the flow communication provided by the end 228 of the feedback tube 224. Consequently, the diaphragm 208 will move (downward when viewing FIG. 1), which in turn moves the control element 174 (downward when viewing FIG. 1) away from the valve seat 162. This opens the valve port 158 more, thus increasing the pressure in the outlet 154. On the other hand, if the sensed pressure is too high (e.g., because downstream demand has decreased), the pressure in the diaphragm chamber 220 is greater than the desired control pressure, and the pressure differential against the diaphragm 208 causes the diaphragm 208 to move (upward when viewing FIG. 1), thus moving the control element 174 toward and closer to the valve seat 162. This decreases the flow through the valve port 158, thus decreasing the pressure in or at the outlet 154.

As discussed above, pressure relief valves are often employed downstream of a pressure regulator to prevent the pressure in the pressure regulator from exceeding a predetermined range or threshold and, in turn, damaging the components of the pressure regulator. As also discussed above, because pressure relief valves are sized based on the maximum flow capacity of the upstream pressure regulator, a larger than necessary pressure regulator, having a larger flow capacity, will in turn lead to a larger than necessary, and very costly, pressure relief valve.

The regulator 100 thus further includes a variable travel stop 300. The variable travel stop 300 is configured to engage the control element 174 to stop movement of the control element 174 upon reaching the open position (thereby limiting the maximum flow through the regulator 100) but can be adjusted to change the open position of the control element 174. More specifically, the variable travel stop 300 can be adjusted to move the control element 174 closer to or further from the valve seat 162 when the control element 174 is in the open position. Accordingly, the wide open flow capacity of the regulator 100 can be adjusted based on different applications. As a result, the regulator 100 can, using the variable travel stop 300, be adjusted to perfectly meet or satisfy the desired capacity for a given application. In other words, a customer looking to purchase a pressure regulator no longer needs to choose a pressure regulator that is larger than necessary. This not only helps to reduce the potential for leakage in a failure situation, but reduces the size of, and thus the cost, of a pressure relief valve utilized in connection with the regulator 100. In fact, in some cases, because the variable travel stop 300 limits the maximum flow through the regulator 100, the variable travel stop 300 may obviate the need for a pressure relief valve.

As best illustrated in FIG. 1A, which shows the control element 174 in the closed position, and FIG. 2A, which shows the control element 174 in the fully open position, the variable travel stop 300 in this example includes or is formed of a first portion 304 and a second portion 308 movable relative to the first portion 304 to change the open position of the control element 174. The first portion 304 has an elongate, cylindrical shape and a length $L_1$ that corresponds to a maximum desired open position of the control element 174 (and thus the maximum capacity or amount of flow permitted through the regulator 100). In this example, the first portion 304 is threaded to the seat 184 such that one end 305A of the first portion 304 is seated against a flanged portion of the seat 184. In other examples, the first portion 304 can be arranged in a different manner (e.g., coupled to the control element 174 itself). The second portion 308 also has a cylindrical shape, but has a length $L_2$ that is shorter than a length $L_1$ of the first portion 304. The second portion 308 is threaded to the first portion 304 at or proximate to an end 305B of the first portion 304 opposite the end 305A, such that the second portion 308 can be moved (e.g., rotated) relative to the first portion 304, thereby increasing or decreasing a total length L of the variable travel stop 300 to change the open position of the control element 174, as will be described in greater detail below.

Figure 3:
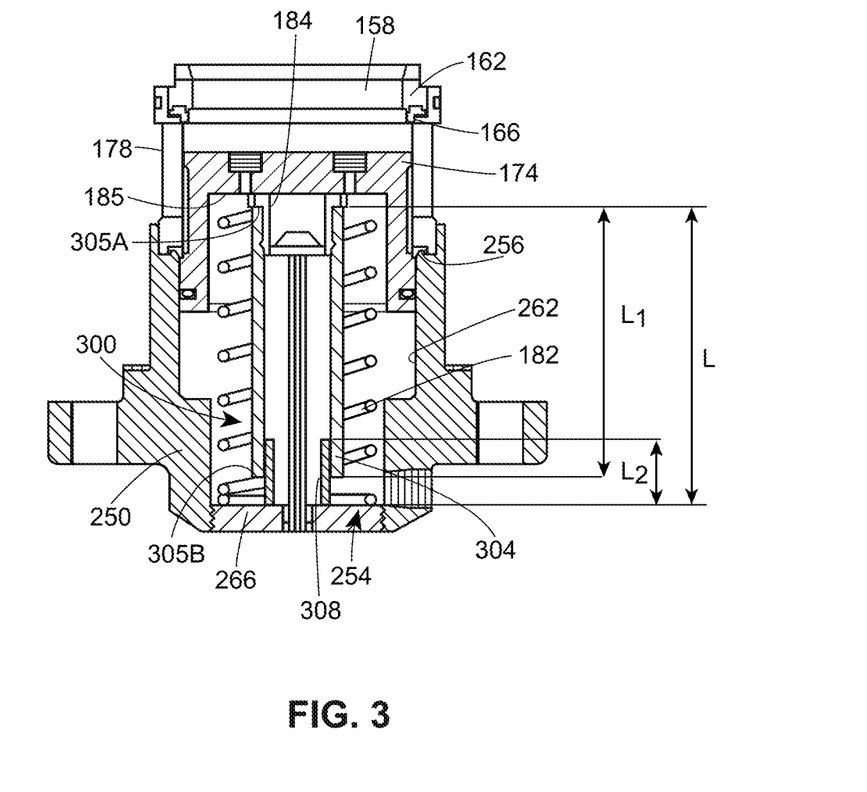
FIG. 3 is similar to FIG. 2A, but shows the travel stop in a second, less than fully open configuration corresponding to a flow capacity of the pressure regulating device that is less than the maximum flow capacity.

Generally speaking, when the control element 174 is in the closed position, as shown in FIG. 1A, there exists a gap between the seating surface 266 of the seat 254 of the bonnet assembly 112 and the first and second portions 304, 308, regardless of the configuration of the variable travel stop 300. Conversely, when the control element 174 is in the open position, some portion of the variable travel stop 300 will engage the seating surface 266 of the seat 254 of the bonnet assembly 112, thereby preventing any further movement (opening) of the control element 174 (and thus limiting the maximum flow through the regulator 100). When, for example, the variable travel stop 300 has a first, fully open configuration, as shown in FIG. 2A, the first portion 304 is either aligned with or extends outward of the second portion 308, and the first portion 304 engages the seating surface 266. So arranged, the total length L of the variable travel stop 300 is at its minimum (and some cases, will be equal to the length $L_1$ of the first portion 304). And because the length $L_1$ of the first portion 304 corresponds to the maximum open position of the control element 174, the variable travel stop 300, when in the fully open configuration, allows the control element 174 to reach its maximum or fully open position. In this position, the control element 174 is spaced the maximum distance from the seating surface 166 of the valve seat 162, and the wide open flow capacity of the regulator 100 is equal to its maximum open flow capacity. When, however, it is desired to decrease the wide open flow capacity of the regulator 100 (e.g., downstream conditions have changed), the variable travel stop 300 may be adjusted or reconfigured to a second, less than fully open configuration, as shown in FIG. 3. To reach this second, less than fully open configuration, the second portion 308 is rotated relative to the first portion 304, which drives the second portion 308 to a position that is axially outward of the first portion 304, such that the second portion 308 now engages the seating surface 266. As such, the total length L of the variable travel stop 300 is increased (e.g., now equals the length $L_1$ plus a portion of the length $L_2$), such that the total length L of the variable travel stop 300 in the second configuration is now greater than its total length L in the first, fully open configuration. In turn, the variable travel stop 300 does not allow the control element 174 to reach its maximum or fully open position, but instead stops the stops the control element 174 at a position closer to the seating surface 166 of the valve seat 162 (i.e., the distance between the control element 174 and the seating surface 166 is less when the travel stop 300 is in the second, less fully open configuration than when the travel stop 300 is in the first, fully open configuration). Thus, by altering the travel stop 300 (from the first to second configurations), the wide open flow capacity of the regulator 100 can be adjusted (in this case decreased).

Of course, it will be appreciated that the variable travel stop 300 can be adjusted or reconfigured to any number of different open configurations to achieve different open flow capacities. As an example, the second portion 308 can be further rotated relative to the first portion 304, to a position further axially outward of the first portion 304 than illustrated in FIG. 3, thereby moving the control element 174, when in the open position, even closer to the seating surface 166 of the valve seat 162. Likewise, if desired, the variable travel stop 300 can be moved or reconfigured from any one of these less open configurations back to the first, fully open configuration illustrated in FIG. 2A, thereby returning the regulator 100 to its original, maximum wide open flow capacity.

It will be also be appreciated that the variable travel stop 300 can be varied to reach different flow capacities. As an example, the length $L_1$ of the first portion 304 of the travel stop 300 can be varied (increased or decreased) to change the fully or maximum open position of the control element 174 and thereby vary (decrease or increase, respectively) the maximum wide open flow capacity of the regulator 100. As another example, which can be alternatively or additionally implemented, the length $L_2$ of the second portion 308 of the travel stop 300 can be varied (e.g., increased or decreased) to provide a different array of less than fully or maximum open positions for the control element 174, thereby providing a different array of wide open flow capacities. Moreover, it will also be appreciated that the variable travel stop 300 can be implemented with different pressure regulating devices, such as, for example, a pressure regulator having a different control assembly than the control assembly 170 of the regulator 100.

Figure 4:
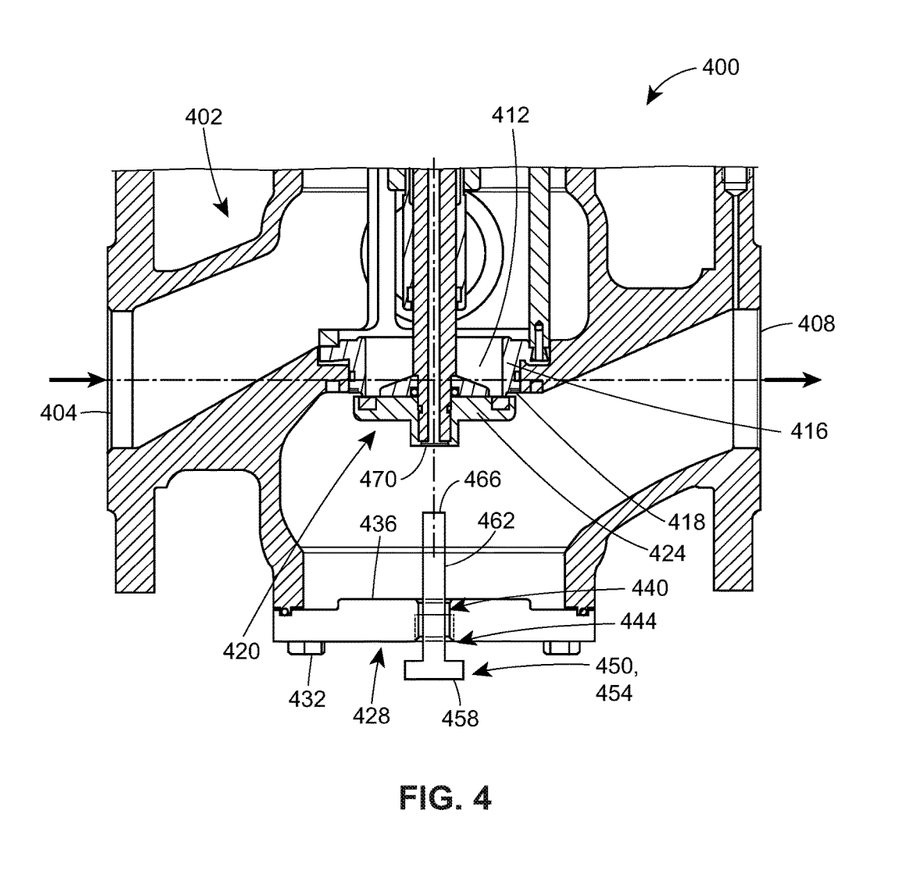
FIG. 4 is a partial, cross-sectional view of a pressure regulating device constructed in accordance with the teachings of a second disclosed example of the present invention, showing the pressure regulating device in a closed position and employing another example of a travel stop that can be varied to adjust the flow capacity of the pressure regulating device.

FIG. 4 illustrates another type of pressure regulating device in the form of a pressure regulator 400 constructed in accordance with the teachings of the present invention. The pressure regulator 400 is constructed differently than the pressure regulator 100, with a different valve body 402 defining a fluid inlet 404, a fluid outlet 408, and a valve port 412 disposed therebetween, a valve seat 416, e.g., a seat ring, secured in the valve port 412 and defining a seating surface 418, and a different control assembly 420 arranged within the valve body 402. Only a portion of the control assembly 420 is visible in FIG. 4, but the control assembly 420 includes, in relevant part, a control element 424, e.g., a valve plug or a valve disk, that is movable, relative to the valve seat 416 (and more particularly the seating surface 418), along a longitudinal axis 426, to control fluid flow between the inlet 404 and the outlet 408. While not illustrated in FIG. 4, the pressure regulator 400 also includes an actuator assembly, e.g., the actuator assembly 108, coupled to the valve body 402 to regulate the pressure at the outlet 408 of the valve body 402 in any well-known manner.

The regulator 400 also includes a cap 428 coupled to the valve body 402. The cap 428 is coupled (e.g., secured) to the valve body 402 with threaded studs 432, though the cap 428 can be coupled to the valve body 402 by any other well-known means. The cap 428 includes a surface 436 and a bore 440 formed through the cap 428 along a central portion of the cap 428. As illustrated in FIG. 4, the surface 436 is an inner surface of the cap 428, such that the surface 436 faces the control assembly 420, and is arranged, at least in this example, within the valve body 402. As also illustrated in FIG. 4, the bore 440 is chamfered, and a sealing element

444, e.g., an o-ring, is arranged in the bore 440 (and more specifically, in the chamfered portion of the bore 440).

Like the regulator 100, the regulator 400 also includes a variable travel stop 450 that is similarly configured to engage the control element 424 to stop movement of the control element 424 upon reaching the open position (thereby limiting the maximum flow through the regulator 400) and can be adjusted to change the open position of the control element 424, such that the open flow capacity of the regulator 400 can be adjusted as desired. However, in the example illustrated in FIG. 4, the variable travel stop 450 takes the form of an externally adjustable bolt 454. The bolt 454, which can be made of or from any suitable material (e.g., WCC, 316/316L, Hastelloy, Monel, one or more other metals, etc.), has a head portion 458 that is disposed outside of, or exterior to, the regulator 400, and a threaded portion 462 that is threadably disposed in the bore 440 of the cap 428. When the bolt 454 is threadably disposed in the bore 440, the sealing element 444 facilitates a seal between the cap 428 and the bolt 454, thereby preventing fluid from exiting or entering the regulator 400 via the bore 440.

Generally speaking, when the control element 424 is in the closed position, as it is in FIG. 4, there exists a gap between a stop surface 466 of the bolt 454 and a bottom surface 470 of the control element 424, regardless of the position of the variable travel stop 450. Conversely, when the control element 424 is in the open position (not shown), the stop surface 466 of the bolt 454 will engage the bottom surface 470 of the control element 424, thereby preventing any further movement (opening) of the control element 424. The travel stop 450 may, for example, be positioned as it is in FIG. 4, in which case the control element 424 will, when moved in a downward direction to the open position, engage the stop surface 466 of the bolt 454, thereby preventing any further movement of the control element 424 (and limiting the maximum flow of fluid through the regulator 400). This position of the travel stop 450 may or may not correspond to the maximum or fully open position of the control element 424. In any event, when it is desired to decrease the wide open flow capacity of the regulator 400 (e.g., because downstream conditions have changed), the travel stop 450 can be externally adjusted by rotating the bolt 454 about the longitudinal axis 426, which drives the head portion 458 toward an underside of the cap 428 (and the seating surface 436) and drives the stop surface 466 toward the valve seat 416. This has the effect of decreasing the gap between the stop surface 466 and the bottom surface 470 of the control element 424 when the control element 424 is in the closed position. In turn, the variable travel stop 450 does not allow the control element 424 to reach its maximum or fully open position, but instead stops the control element 424 at a position closer to the seating surface 418 of the valve seat 162 (than would it otherwise would in the maximum or fully open position). Thus, by altering the travel stop 450, the wide open flow capacity of the regulator 400 can be adjusted (in this case decreased).

Of course, it will be appreciated that the variable travel stop 450 can be adjusted or reconfigured to any number of positions relative to the control element 424 to achieve different wide open flow capacities. As an example, the stop surface 466 of the bolt 454 can be further rotated to a position further axially outward of the seating surface 436 than illustrated in FIG. 4, thereby moving the control element 424, when in the open position, even closer to the seating surface 418 of the valve seat 416. Likewise, if desired, the variable travel stop 450 can be moved or reconfigured from any one of these less open configurations back to the maximum or fully open position, thereby returning the regulator 400 to its original, maximum wide open flow capacity.

It will be also be appreciated that the variable travel stop 450 can be varied to reach different flow capacities. As an example, the length of the threaded portion 462 of the bolt 454 can be varied (increased or decreased) to provide a different array of less than fully or maximum open positions for the control element 424, thereby providing a different array of wide open flow capacities. Moreover, it will also be appreciated that the variable travel stop 450 can be implemented with different pressure regulating devices, such as, for example, a pressure regulator having a different control assembly than the control assembly 420 of the regulator 400.

While not illustrated in FIG. 4, it will be further appreciated that the regulator 400 may also include a travel indicator and/or a locking mechanism for use with the variable travel stop 450. The travel indicator, which can be positioned outside of the regulator 400, can provide a visual indication of the position of the variable travel stop 450, thereby allowing a user of the regulator 400 to determine the current open position of the control element 424 and, thus, the current wide open flow capacity of the regulator 400. The locking mechanism can meanwhile be used to lock the variable travel stop 450 in the desired position, thereby preventing tampering with or accidental adjustment of the variable travel stop 450.

Finally, while the regulators 100 and 400 described herein include variable travel stops in the form of the two-piece threaded travel stop 300 and an externally adjustable bolt 450, respectively, the regulator 100, the regulator 400, and/or a different pressure regulating device can include a variable travel stop that is constructed in a different manner but still facilitates adjustment of the wide open flow capacity of the respective regulator. Such a variable travel stop can, for example, take the form of a sleeve, a different fastener (e.g., a screw), a differently constructed two-piece assembly, or some other structure.

From the foregoing, it can be seen that the present disclosure advantageously provides a pressure regulating device including a travel stop that can be varied to adjust a wide open or choke flow capacity of the pressure regulating device. This variability allows a customer to meet a desired capacity at worst-case conditions while also reducing unnecessary capacity (a problem with known pressure regulators when available sizes do not match up with the size needed to meet the desired capacity), thereby minimizing the potential for greater leakage and reducing the cost of providing relief capabilities (and in some cases, may actually eliminate the need for relief capabilities, due to the fact that the variable travel stop can limit maximum flow through the regulator). At the same time, this variability also gives the customer tremendous flexibility, as the customer can select from a wide range of flow capacities, and the customer can easily and quickly adapt the flow capacity of the pressure regulating device to account for, for example, changes in downstream conditions (which may, for example, reduce the desired capacity at worst-case conditions). Beneficially, the variable travel stop described herein can, unlike restriction collars and other known options, be easily and quickly manufactured and implemented within a pressure regulating device in a cost-effective manner.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed is:

1. A pressure regulating device, comprising: a valve body having an inlet, an outlet, and a fluid passageway defined therebetween; an actuator assembly coupled to the valve body, the actuator assembly comprising an upper casing, a lower casing secured to the upper casing, and a diaphragm disposed between the upper casing and the lower casing; a valve seat disposed in the valve body along the fluid passageway; a control assembly operatively connected to the diaphragm to move responsive to movement of the diaphragm, the control assembly comprising a valve stem and a control element operatively connected to the valve stem and movable, relative to the valve seat, between an open position, wherein the control element is spaced from the valve seat, and a closed position, wherein the control element sealingly engages the valve seat; a travel stop configured to engage the control element when the control element is in the closed position and to stop movement of the control element upon reaching the open position, wherein the travel stop is adjustable to change the open position of the control element, such that a wide open flow capacity of the pressure regulating device can be adjusted, wherein a portion of the travel stop is movable relative to the control element to adjust the travel stop, and wherein movement of the portion away from the control element decreases a stroke of the control element, wherein the control element is disposed between the valve stem and the travel stop; and a bonnet assembly that is coupled to the valve body and spaced from the lower casing of the actuator assembly, the bonnet assembly defining a seating surface for the travel stop.

2. The pressure regulating device of claim 1, wherein the travel stop comprises a first portion and the portion of the travel stop comprises a second portion movable relative to the first portion and the control element to adjust the travel stop, and wherein one of the first portion and the second portion engages the seating surface of the bonnet assembly when the control element has reached the open position.

3. The pressure regulating device of claim 2, wherein the second portion is movable relative to the first portion to adjust a length of the travel stop, thereby changing the open position of the control element and the stroke of the control element.

4. The pressure regulating device of claim 2, wherein when the control element is in the open position, the control element is spaced a first distance from the valve seat when the first portion engages the seating surface of the bonnet assembly, and the control element is spaced a second distance from the valve seat when the second portion engages the seating surface of the bonnet assembly, the first distance being greater than the second distance.

5. The pressure regulating device of claim 2, wherein the second portion is threaded to the first portion.

6. The pressure regulating device of claim 1, wherein the travel stop is entirely disposed between a surface of the control element and the seating surface of the bonnet assembly.

7. The pressure regulating device of claim 1, wherein the control assembly further comprises a valve spring configured to bias the control element to the closed position, wherein the valve spring surrounds the travel stop.

8. The pressure regulating device of claim 1, wherein the travel stop engages the control element via a seat carried by the control element, and wherein the control assembly further comprises a valve spring configured to bias the control element to the closed position, the valve spring having one end seated against the spring seat.

9. The pressure regulating device of claim 1, wherein the travel stop comprises a first portion and the portion of the travel stop comprises a second portion movable relative to the first portion and the control element to adjust the travel stop, and wherein the second portion is at least partially disposed within the first portion when the control element is in the open position.

10. The pressure regulating device of claim 1, wherein the travel stop comprises a first portion and the portion of the travel stop comprises a second portion movable relative to the first portion and the control element to adjust the travel stop, and wherein movement of the second portion away from the control element decreases the stroke of the control element.

11. A control assembly for controlling fluid flow in a pressure regulating device having a valve body and a valve seat disposed in the valve body, the control assembly comprising:
 a valve stem;
 a control element operatively connected to the valve stem and adapted to be movable, relative to the valve seat, between an open position, wherein the control element is spaced from the valve seat, and a closed position, wherein the control element sealingly engages the valve seat; and
 a travel stop configured to engage the control element when the control element is in the closed position and to stop movement of the control element upon reaching the open position, wherein the travel stop is adjustable to change the open position of the control element, wherein a portion of the travel stop is movable relative to the control element to adjust the travel stop, and wherein movement of the portion away from the control element decreases a stroke of the control element,
 wherein the control element is disposed between the valve stem and the travel stop.

12. The control assembly of claim 11, wherein the travel stop comprises a first portion and the portion of the travel stop comprises a second portion movable relative to the first portion and the control element to adjust the travel stop, and wherein movement of the second portion away from the control element decreases the stroke of the control element.

13. The control assembly of claim 12, wherein the second portion is movable relative to the first portion to adjust a length of the travel stop, thereby changing the open position of the control element.

14. The control assembly of claim 12, wherein the second portion is threaded to the first portion.

15. The control assembly of claim 11, wherein the control element is movable along a longitudinal axis, and wherein the travel stop is rotatable about the longitudinal axis.

16. The control assembly of claim 11, further comprising a valve spring configured to bias the control element to the closed position, wherein the valve spring surrounds the travel stop.

17. A method of adjusting a wide open flow capacity of a pressure regulating device having a valve body, an actuator assembly coupled to the valve body and comprising an upper casing, a lower casing secured to the upper casing, and a diaphragm disposed between the upper casing and the lower casing, a valve seat disposed in the valve body along a fluid passageway, a control assembly operatively connected to the diaphragm to move responsive to movement of the diaphragm, the control assembly comprising a valve stem and a control element operatively connected to the valve stem and movable, relative to the valve seat, between an open position, wherein the control element is spaced from the valve seat, and a closed position, wherein the control element sealingly engages the valve seat, and a bonnet assembly that is coupled to the valve body and spaced from the lower casing of the actuator assembly, the method comprising: adjusting a travel stop configured to engage the control element when the control element is in the closed position and to stop movement of the control element upon reaching the open position, thereby changing the open position of the control element, wherein the control element is disposed between the valve stem and the travel stop, wherein adjusting the travel stop comprises moving a portion of the travel stop toward or away from the control element and a seating surface defined by the bonnet assembly, and wherein moving the portion of the travel stop away from the control element decreases a stroke of the control element.

18. The method of claim 17, wherein the travel stop comprises a first portion and the portion of the travel stop comprises a second portion, and wherein adjusting the travel stop comprises increasing or decreasing a length of the travel stop by rotating the second portion of the travel stop relative to the first portion of the travel stop.

19. The method of claim 17, wherein the travel stop comprises a first portion and the portion of the travel stop comprises a second portion, and wherein adjusting the travel stop comprises moving the second portion of the travel stop relative to the first portion of the travel stop and the control element, and wherein moving the second portion away from the control element decreases the stroke of the control element.

20. A pressure regulating device, comprising:
a valve body having an inlet, an outlet, and a fluid passageway defined therebetween;
an actuator assembly coupled to the valve body, the actuator assembly comprising an upper casing, a lower casing secured to the upper casing, and a diaphragm disposed between the upper casing and the lower casing;
a valve seat disposed in the valve body along the fluid passageway;
a control assembly operatively connected to the diaphragm to move responsive to movement of the diaphragm, the control assembly comprising a valve stem and a control element operatively connected to the valve stem and movable, relative to the valve seat, between an open position, wherein the control element is spaced from the valve seat, and a closed position, wherein the control element sealingly engages the valve seat;
a travel stop configured to engage the control element when the control element is in the closed position and to stop movement of the control element upon reaching the open position, wherein the travel stop is adjustable to change the open position of the control element, such that a wide open flow capacity of the pressure regulating device can be adjusted, wherein a portion of the travel stop is movable relative to the control element to adjust the travel stop, and wherein movement of the portion away from the control element decreases a stroke of the control element; and
a bonnet assembly coupled to the valve body, the bonnet assembly defining a seating surface for the travel stop,
wherein the travel stop comprises a first portion and the portion of the travel stop comprises a second portion movable relative to the first portion and the control element to adjust the travel stop, wherein one of the first portion and the second portion engages the seating surface of the bonnet assembly when the control element has reached the open position, and
wherein when the control element is in the open position, the control element is spaced a first distance from the valve seat when the first portion engages the seating surface of the bonnet assembly, and the control element is spaced a second distance from the valve seat when the second portion engages the seating surface of the bonnet assembly, the first distance being greater than the second distance.

* * * * *

UNITED STATES PATENT AND TRADEMARK OFFICE
CERTIFICATE OF CORRECTION

PATENT NO. : 10,520,957 B2  
APPLICATION NO. : 15/299159  
DATED : December 31, 2019  
INVENTOR(S) : Jeff Welch, II et al.

Page 1 of 1

It is certified that error appears in the above-identified patent and that said Letters Patent is hereby corrected as shown below:

In the Specification

At Column 5, Lines 4-5, "valve body 108," should be -- valve body 104, --.

At Column 7, Line 37, "some" should be -- in some --.

At Column 7, Line 63, "stops the stops the" should be -- stops the --.

At Column 10, Lines 30-31, "bolt 450," should be -- bolt 454, --.

Signed and Sealed this  
Twelfth Day of April, 2022

Drew Hirshfeld  
*Performing the Functions and Duties of the  
Under Secretary of Commerce for Intellectual Property and  
Director of the United States Patent and Trademark Office*